June 14, 1966  E. GÖTZ  3,256,424
DIGITAL CURVE COMPUTER FOR USE IN CONTROLLING THE PATH
OF A WORK TOOL OR WORK PIECE
Filed April 5, 1963

Inventor:
Elmar Götz

By: Spencer & Kaye
Attorneys

United States Patent Office 3,256,424
Patented June 14, 1966

3,256,424
DIGITAL CURVE COMPUTER FOR USE IN CONTROLLING THE PATH OF A WORK TOOL OR WORK PIECE
Elmar Götz, Frankfurt-Gravenbruch, Germany, assignor to Licentia Patent-Verwaltungs G.m.b.H., Frankfurt am Main, Germany
Filed Apr. 5, 1963, Ser. No. 270,839
Claims priority, application Germany, Apr. 13, 1962, L 41,749
5 Claims. (Cl. 235—156)

The present invention relates to a digital computer.

More particularly, the present invention relates to an improvement of the arrangement disclosed and claimed in co-pending application Serial No. 78,574, filed December 27, 1960, by Heinz Günter Lott, Elmar Götz, and Peter Boese, now Patent No. 3,109,092 issued October 29, 1963. The arrangement of the earlier application involves a digitally operating computer which has the characteristic data of a curve, composed of rectilinear and/or circular portions, fed into it and which continually computes points along the curve which are sufficiently close to each other to allow the curve to be followed. All of the positions of the digital number representing the coordinates $x_\nu$ and $y_\nu$ of a calculated point $P_\nu$ along the curve appear in synchronism and simultaneously at the output of the computer and, after a time interval depending on the clock pulse frequency $f_t$ at which the computer is set to operate, are replaced by the data pertaining to the next point along the curve. Such an arrangement may be used, for example, for controlling the path along which the tool of a machine tool moves with respect to a work piece, or the path along which the work piece is moved relative to the work tool.

The computer arrangement disclosed in Patent No. 3,109,092 is able to compute the coordinates of only those curves which are composed of rectilinear or circular arcuate portions, or of curves which can be approximated by such portions. The characteristic curve data includes the starting and end points of the rectilinear portions and the starting and end points as well as the center of each circular curve portion, and the manner in which the computer operates for calculating the points along rectilinear curve portions differs from the manner of operation involving circular curve portions.

It is, therefore, an object of the present invention to provide an arrangement which, though essentially similar to that disclosed in Patent No. 3,109,092 is able to compute the coordinates of conic, i.e., elliptic, hyperbolic and parabolic, curve sections. The particular manner in which this is achieved will be best understood by referring to the accompanying drawings, in which.

Figure 1:
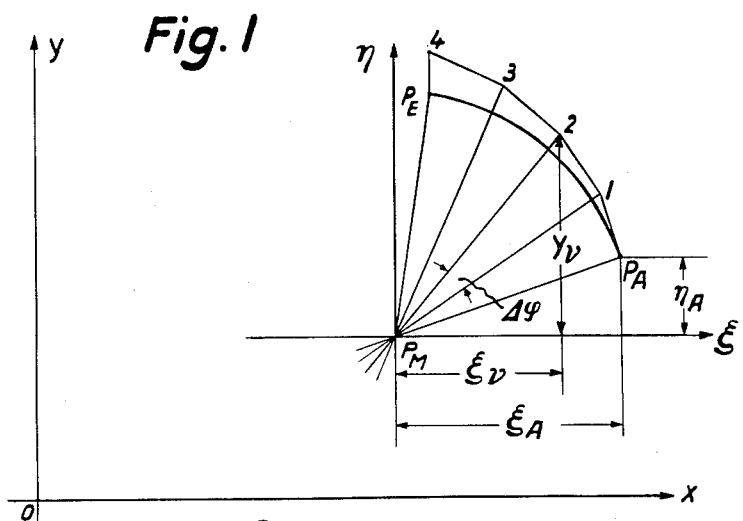
FIGURE 1 is a plot of a circular curve portion the coordinates of whose points are to be calculated.

The present invention relates mainly to the circuitry by means of which the computer is able to calculate the coordinates of points along an arcuate curve portion. To facilitate an understanding of this, there will first be described the manner in which the arrangement according to Patent No. 3,109,092 operates in order to calculate the coordinates of points along a circular curve portion, i.e., a curve portion which is part of a circle. In essence the computer operates according to the following two equations:

$$x_\nu = x_M + \xi_A - \sum_0^{\nu-1} \eta \nu \Delta \varphi \quad (1)$$

$$y_\nu = y_M + \eta_A + \sum_0^{\nu-1} \xi \nu \Delta \varphi \quad (2)$$

where $\xi_A$ and $\eta_A$ represent the coordinates of a starting point $P_A$ in a coordinate system $(\xi, \eta)$ having its origin at the center $P_M$ of the circular curve portion, as shown in FIGURE 1. The factor $\Delta \varphi$ represents a computer constant which is sufficiently small so as to obtain the necessary resolving power. Mathematically, the constant $\Delta \varphi$ represents, during the calculation of a circular portion, the ratio of the circular segment between two points along the curve to the radius, i.e., the constant $\Delta \varphi$ represents the angle formed between two radii of the circle passing, respectively, through the two points.

FIGURE 1 shows a circular curve portion which is traversed in four steps. The number of steps has been kept so small solely to facilitate illustration and explanation, it being understood that, in practice, the number of steps required to traverse a circular curve portion subtending the angle which the illustrated curve portion $P_A - P_E$ subtends will be much larger. The formulas according to which the computer operates while computing the points along a circular portion will not be exact but be only an approximation. This can be seen from the fact that the point 4 does not coincide precisely with point $P_E$. What actually happens is that, beginning with point $P_A$, the path which is followed is a tangent to the circle, this tangent being traversed until the angle has been covered; the first segment will thus end at point 1. From there, the next segment is traversed, albeit in a shifted tangent, until the point 2 is reached, and so on. It will be appreciated, therefore, that the above equations (1) and (2) are not exact but represent limit conditions, the path which is actually followed being not truly circular but polygonal.

Figure 2:
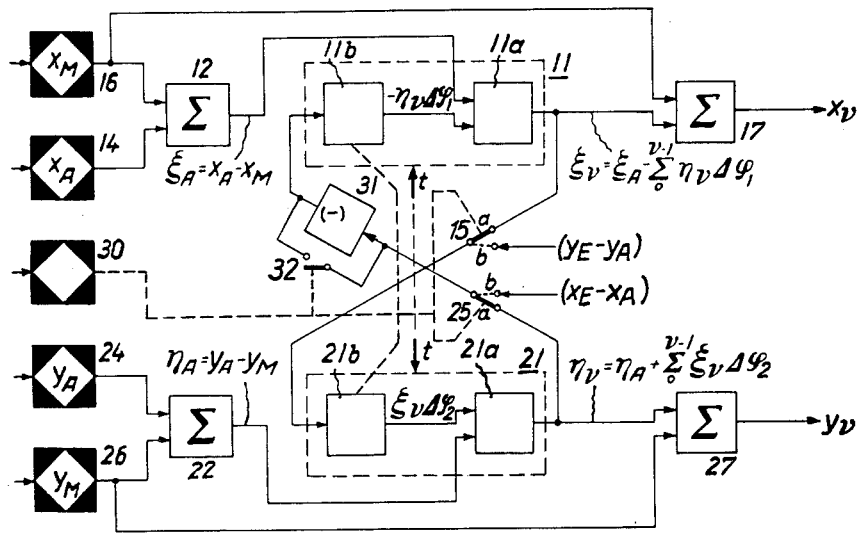
FIGURE 2 is a schematic diagram of a computer according to the present invention.

The circuit arrangement of the computer according to the present invention, shown in FIGURE 2, is basically similar to that of the computer disclosed in Patent No. 3,109,092, but additionally includes three switches 15, 25 and 32, whose function will be described below, so that the operation of the computer disclosed in Patent No. 3,109,092 can readily be explained with reference to FIGURE 2, if, for the time being, the presence of the three switches is ignored. The components 14 and 24 are storage devices containing the coordinates $x_A$ and $y_A$, respectively, of the starting point $P_A$ while components 16 and 26 are storage devices containing the coordinates $x_M$ and $y_M$, respectively, of the center point $P_M$. The summation components 12 and 22 form the difference values $(x_M - x_A)$ and $(y_M - y_A)$, respectively, which difference values are applied to addition registers 11a and 21a of the main computing components 11 and 21. The output value $\eta\nu$ of the main computing component 21 is multiplied by $(-1)$ by a multiplier 31, whose output, in turn, is multiplied by $\Delta \varphi$ by a multiplier 11b of the main computer component 11. The output value of the main computer component 11 is applied to the input of the multiplier 21b of the main computer component 21, where it is multiplied by $\Delta\varphi$. With each clock pulse $t$, the numbers in the multipliers 11b and 21b are added to the numbers already stored in the additional registers 11b and 21b. The numbers $\xi\nu$ and $\eta\nu$ accumulated in the addition registers, without their lower digits which would surpass the resolving power as set by the size of the raster unit, are added to the coordinates $x_M$ and $y_M$ of the center point $P_M$ in summation components 17 and 27, the outputs of which constitute the output of the computer.

As already stated above, the computer disclosed in Patent No. 3,109,092 is able to compute the coordinates of only those curves which are composed of rectilinear or circular portions, or of curves which can be approximated by such portions. According to the present invention, the computer is improved so as to enable it to calculate the coordinates of conic, i.e., elliptic, hyperbolic and parabolic, curve portions as well, this being accomplished as follows:

(1) To enable the computer to calculate the coordinates of an elliptic curve, the multiplication constant $\Delta\varphi$ for one of the two coordinates is changed by a factor $k$ and for the other of the two coordinates by a factor $1/k$, where $k$ is the ratio of the two axes of the ellipse.

(2) To enable the computer to calculate the coordinates of a hyperbolic curve, the multiplication constants $\Delta\varphi$ are changed by the factors $k$ and $1/k$, as above, and additionally, the incremental value of one of the coordinates is not multiplied by $(-1)$, or the incremental values of both coordinates are multiplied by $(-1)$.

(3) To enable the computer to calculate the coordinates of a parabolic curve, the main computer component of one of the coordinates has the difference between the end and starting points of the parabolic curve applied to it, i.e., the value $(x_E-x_A)$ if the coordinate is the $x$-coordinate, or the value $(y_E-y_A)$ if the coordinate is the $y$-coordinate, it being possible for the values $\Delta\varphi$ for the two coordinates to be different from each other, and the incremental values in the two coordinates being either subtracted or added.

The computer can, according to the present invention, be switched to compute the coordinates along the desired conic, i.e., elliptic, hyperbolic or parabolic, curve.

If the curve to be calculated is elliptic, the computer will operate according to the following equations:

$$x_\nu = x_s + \xi_A - \sum_0^{\nu-1} \eta\nu\Delta\varphi_1 \qquad (3)$$

$$x_\nu = y_s + \eta_A + \sum_0^{\nu-1} \xi\nu\Delta\varphi_2 \qquad (4)$$

The factors by which the multipliers 11b and 21b multiply their respective input values are thus different, these factors bearing the following relationship to each other:

$$k\Delta\varphi_1 = \frac{1}{k}\Delta\varphi_2$$

where $k$ is the ratio of the two axes of the ellipse. The coordinates $x_s$, $y_s$, are those of the geometric center $P_s$ of the ellipse, the origin of the $(\xi, \eta)$ coordinate system coinciding with $P_s$. The circuit of FIGURE 2 will be operated while the switches occupy the positions shown, i.e, the switches 15 and 25 are in their respective positions $a$ and the switch 32 is open.

If the curve to be calculated is hyperbolic, the computer will operate according to the following equations:

$$x_\nu = x_s + \xi_A \pm \sum_0^{\nu-1} \eta\nu\Delta\varphi_1 \qquad (5)$$

$$y_\nu = y_s + \eta_A \pm \sum_0^{\nu-1} \xi\nu\Delta\varphi_2 \qquad (6)$$

Equations 5 and 6 differ from Equations 3 and 4 only in that the summation values in the two equations are both either added or subtracted simultaneously. The coordinates $x_s$ and $y_s$ are the coordinates of the geometric center of the hyperbola, which again coincides with the origin of the $(\xi, \eta)$ coordinate system. The switches 15 and 25 remain closed. Furthermore, the switch 32 is closed, but it can remain open if a further negating element, i.e., a multiplier which multiplies by the value $(-1)$, is interposed between the output of the main computing component 11 and the input of the multiplier 21b. In either event, the output of each main computer component is applied to the input of the multiplier of the other main computer component with the same algebraic sign.

If the curve to be calculated is parabolic, the computer will operate according to the following equations:

$$x_\nu = x_s + \xi_A \pm \sum_0^{\nu-1} (x_E - x_A)\Delta\varphi_1 \qquad (7)$$

$$y_\nu = y_s + \eta_A \pm \sum_0^{\nu-1} \xi\nu\Delta\varphi_2 \qquad (8)$$

or $$x_\nu = x_s + \xi_A \pm \sum_0^{\nu-1} \eta\nu\Delta\varphi_1 \qquad (7a)$$

$$x_\nu = y_s + \eta_A \pm \sum_0^{\nu-1} (y_E - y_A)\Delta\varphi_2 \qquad (8a)$$

In the above Equations 7, 8; 7a, 8a; the multiplying factors $\Delta\varphi_1$ and $\Delta\varphi_2$ can but need not be equal to each other, their ratio fixing the parameters of the parabola. The coordinates $x_s$, $y_s$, are those of the point $P_s$ which is the vertex of the parabola. The increments are, in both sets of equations, subtracted or added, depending on the orientation of the parabola. In operation, one of the two switches 15 and 25 is in position $a$ while the other is in position $b$; if switch 15 is in position $a$ and switch 25 in position $b$, the computer will operate according to Equations 7 and 8, while if switch 15 is in position $b$ and switch 25 in position $a$, the computer will operate according to Equations 7a and 8a. Switch 32 is closed; alternatively, the switch 32 remains open if a further $(-1)$ multiplier is interposed between the output of main computer component 11 and the multiplier 21b so that here, too, the inputs to the multipliers are applied with the same algebraic sign.

FIGURE 2 also shows a storage device 30 which contains the information as to what type of curve portion is to be calculated, this information being transmitted, in any suitable manner, to the switches and multipliers, including a switch controlling the $(-1)$ multiplier which may be connected ahead of multiplier 21b. The commands thus transmitted to the circuit components may, of course, be such as to let the computer calculate the coordinates of a circular curve portion having the point $P_M$ as its center, or a rectilinear curve portion. For calculating circular curve portions, both of switches 15 and 25 will be in position $a$ and switch 32 open, as illustrated, and $\Delta\varphi_1 = \Delta\varphi_2$; if the computer is to calculate a rectilinear curve portion, the input to the multiplier of each main computer component will come not from the output of the other main computer component but from the summation component 12 or 22 pertaining to the same coordinate, and the inputs to the addition registers 11a, 21a, which, in FIGURE 2, are shown as being connected to the outputs of the summation components 12, 22, respectively, will instead be connected to the storage devices 14, 24, respectively, as disclosed in Patent No. 3,109,092. In this way, the computer according to the present invention will be able to compute the coordinates of whatever rectilinear, circular, elliptic, hyperbolic or parabolic curve sections are called for by the program.

It will be understood that the above description of the present invention is susceptible to various modifications, changes and adaptations, and the same are intended to be comprehended within the meaning and range of equivalents of the appended claims.

What is claimed is:

1. A digital computer for computing the coordinates of a conic curve portion having a reference point $P_M$ whose coordinates are $x_M$ and $y_M$, and a starting point whose coordinates, in a coordinate system $(\xi, \eta)$ having said point $P_M$ at its origin, are $\xi_A$ and $\eta_A$, which computer comprises, in combination:

(a) an x-coordinate main computer component having a multiplier for multiplying by a factor $\Delta\varphi_1$ and an addition register having one input connected to the output of said multiplier;

(b) a y-coordinate main computer component having a multiplier for multiplying by a factor $\Delta\varphi_2$ and an addition register having one input connected to the output of said last-mentioned multiplier;

(c) means for supplying the value $\xi_A$ to another input of the addition register of said x-coordinate main computer component and the value $\eta_A$ to another input of the addition register of said y-coordinate main computer component;

(d) means for applying to the inputs of said multiplier values which enable said computer to calculate the coordinates of a particular type of conic curve;

(e) means for periodically feeding the contents of said multipliers to the corresponding addition registers;

(f) an x-coordinate output component for supplying to the output of the computer values equal to the output of the x-coordinate addition register plus the coordinate $x_M$; and (g) a y-coordinate output component for supplying to the output of the computer values equal to the output of the y-coordinate addition register plus the coordinate $y_M$.

2. A digital computer as defined in claim 1 wherein said conic curve portion is an elliptical one and said point $p_M$ is the geometric center of the ellipse, wherein $$k\Delta\varphi_1 = \frac{1}{k}\Delta\varphi_2$$

where $k$ is the ratio of the two axes of the ellipse, and wherein said means $(d)$ comprise means for applying the positive of the output of one of said main computer components to the multiplier of the other of said main computer components, and means for applying the negative of the output of said other main computer component to the multiplier of said one main computer component.

3. A digital computer as defined in claim 1 wherein said conic curve portion is a hyperbolic one and said point $P_M$ is the geometric center of the hyperbola, and wherein said means $(d)$ comprise means for applying, with a given algebraic sign, the output of the x-coordinate main computer component to the multiplier of the y-coordinate main computer component, and means for applying, with the same algebraic sign, the output of said y-coordinate main computer component to the multiplier of said x-coordinate main computer component.

4. A digital computer as defined in claim 1 wherein said conic curve portion is a parabolic one and said point $P_M$ is the vertex of the parabola, and wherein said means $(d)$ comprise means for applying, to the multiplier of one of said main computer components, with a given algebraic sign, the difference between the end and starting points of the curve in the respective coordinate, and means for applying, with the same algebraic sign, the output of said one main computer component to the multiplier of the other of said main computer components.

5. A computer as defined in claim 1 and capable of calculating an elliptical curve portion whose geometric center is at said point $P_M$, a hyperbolic curve portion whose geometric center is at said point $P_M$, or a parabolic curve portion whose vertex is at said point $P_M$, said means $(d)$ comprising:

(1) means connecting the output of one of said main computer components with the input of the multiplier of the other of said main computer components;

(2) means connecting the output of the other of said main computer components with the input of the multiplier of said one main computer component;

(3) at least one of said connecting means comprising a $(-1)$ multiplier and first switch means for deactivating said $(-1)$ multiplier;

(4) at least one of said connecting means comprising second switch means for disconnecting the input of the respective multiplier from the output of the particular main computer component to which it is connected and in lieu thereof connecting such multiplier to a means for applying the difference, in the coordinate of such multiplier, between the end and starting points of the curve; and (5) means responsive to the particular curve whose coordinates are to be calculated for controlling said first and second switch means and the factors by which said multipliers of said main computer components multiply their respective input values.

No references cited.

ROBERT C. BAILEY, *Primary Examiner.*